(12) United States Patent
Lee

(10) Patent No.: US 8,676,905 B2
(45) Date of Patent: Mar. 18, 2014

(54) METHOD FOR PROCESSING CONTENT AND TERMINAL THEREOF

(75) Inventor: Ji-Hye Lee, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 285 days.

(21) Appl. No.: 12/530,985

(22) PCT Filed: Apr. 4, 2008

(86) PCT No.: PCT/KR2008/001923
§ 371 (c)(1),
(2), (4) Date: Sep. 11, 2009

(87) PCT Pub. No.: WO2008/123707
PCT Pub. Date: Oct. 16, 2008

(65) Prior Publication Data
US 2010/0115346 A1    May 6, 2010

Related U.S. Application Data

(60) Provisional application No. 60/910,523, filed on Apr. 6, 2007.

(30) Foreign Application Priority Data

Oct. 9, 2007  (KR) .................. 10-2007-0101679
Nov. 19, 2007 (KR) .................. 10-2007-0118152
Mar. 21, 2008 (KR) .................. 10-2008-0026590
Apr. 4, 2008  (KR) .................. 10-2008-0031444

(51) Int. Cl.
*G06F 15/16* (2006.01)
*G06F 11/00* (2006.01)

(52) U.S. Cl.
USPC .............. 709/206; 709/203; 709/231; 714/49

(58) Field of Classification Search
USPC .................. 709/201–207, 217–232; 714/49, 714/E11.002
See application file for complete search history.

(56) References Cited

U.S. PATENT DOCUMENTS

| | | | |
|---|---|---|---|
| 2003/0101213 A1* | 5/2003 | Wright | 709/203 |
| 2005/0212799 A1* | 9/2005 | Liao et al. | 345/420 |
| 2006/0026654 A1 | 2/2006 | An et al. | |
| 2006/0211425 A1* | 9/2006 | Bae et al. | 455/445 |
| 2006/0212524 A1* | 9/2006 | Wu et al. | 709/206 |
| 2007/0050447 A1* | 3/2007 | Oikarinen | 709/203 |
| 2007/0055700 A1* | 3/2007 | Yang et al. | 707/104.1 |

(Continued)

FOREIGN PATENT DOCUMENTS

KR  10-2004-0089174 A  10/2004
KR  10-2005-0053367 A  6/2005

*Primary Examiner* — Yasin Barqadle
(74) *Attorney, Agent, or Firm* — Birch, Stewart, Kolasch & Birch, LLP

(57) ABSTRACT

A method for processing a DCD content in a DCD (Dynamic Content Delivery). When a DCD content is delivered between a server and a terminal in a DCD service system, a client of the terminal delivers the DCD content to a DECA (DCD Enabled Client Application) of the terminal. If the DECA cannot play (execute) the content, the DECA sends to the client an error notification message and a generated status value (information about device capabilities of the terminal), and the client sends the error notification message and the status value to the server. Accordingly, if an error informing that the content received from the server cannot be played has occurred, the error is processed between the terminal and the server from the point of the terminal.

16 Claims, 10 Drawing Sheets

(56) References Cited

U.S. PATENT DOCUMENTS

| | | | |
|---|---|---|---|
| 2007/0204311 A1* | 8/2007 | Hasek et al. | 725/91 |
| 2007/0244987 A1* | 10/2007 | Pedersen et al. | 709/217 |
| 2007/0282959 A1* | 12/2007 | Stern | 709/206 |
| 2008/0229217 A1* | 9/2008 | Kembel et al. | 715/760 |

\* cited by examiner

Notification Path
One-way Data Path
Two-way Data Path

FIG.10

| Information Element | Type | Description |
|---|---|---|
| reserved-storage | String | Total memory in bytes that is currently reserved for DCD content storage managed by the DCD Client. |
| free-storage | String | Amount of free memory in bytes in the reserved DCD content storage. |
| roaming-status | String | Current roaming status, one of "home", "roam", "international". |
| available-bearers | List of Strings | Types of all available bearer networks: one or more of "UMTS", "WiMAX", "LTE", "802.11",, "CBS", "BCAST". |
| preferred-bearers | List of Strings | Preference for specific bearers, if available, in priority order: One or more of "UMTS", "WiMAX", "LTE", "802.11",, "CBS", "BCAST" |
| unsupported-channel-metadata | List of Strings | Unsupported channel metadata, if they are not supported by the DCD Client. One or more of table 151,152,153,154,155 in section 8.2.2<br>When the DCD Client is upgraded and it can support more metadata than before, the DCD Client removes the supported metadata in the next. |
| unsupported-content-metadata | List of Strings | Unsupported content metadata, if they are not supported by the DCD Client. One or more of table 156 in section 8.3.2<br>When the DCD Client is upgraded and it can support more metadata than before, the supported metadata should be removed. |

METHOD FOR PROCESSING CONTENT AND TERMINAL THEREOF

This application is the National Phase of PCT/KR2008/001923 filed on Apr. 4, 2008, which claims priority under 35 U.S.C. 119(e) to U.S. Provisional Application Ser. No. 60/910,523 filed on Apr. 6, 2007 and under 35 U.S.C. 119(a) to Patent Application Nos. 10-2007-0101679 filed in Korea on Oct. 9, 2007, 10-2007-0118152 filed in Korea on Nov. 19, 2007, 10-2008-0026590 filed in Korea on Mar. 21, 2008 and 10-2008-0031444 filed in Korea on Apr. 4, 2008 all of which are hereby expressly incorporated by reference into the present application.

BACKGROUND OF THE INVENTION

1. Field of the Invention

The present invention relates to a dynamic content delivery (DCD), and in particular, to a method for processing content in a DCD and a terminal implementing the same.

2. Description of the Background Art

In general, a dynamic content delivery (hereinafter, refer to as "DCD") indicates a delivery between a terminal and a server based on a content service designed to periodically deliver a personalized content to the terminal. The DCD service signifies a set of methods and functions allowing a DCD provider and an end-user to communicate and interact with each other.

Recently, various functions, which are capable of periodically downloading a plurality of online contents provided by a DCD server through a DCD client by using the DCD server and the DCD client provided in a terminal, and then sequentially displaying them on a screen of the terminal, have been introduced.

The DCD supports a variety of network technologies, such as an end-to-end network, a broadcast network, and the like. In the DCD, a transport layer may be logically divided into 3 transport paths. As shown in FIG. 1, such 3 transport paths may include a notification path, a one-way data path, and a 2-way data path. Among the 3 paths, communication between the DCD client and the DCD server on the 2-way data path is explained as follows: First, if the DCD client (DCD-enabled terminal) requests a DCD content from the DCD server, the DCD server, in response to the request, transmits the DCD content to the DCD client.

A method for receiving, by a terminal, a DCD data from a server through the conventional 2-way data path is explained as follows: A server receives data from a content provider, and stores it to a certain memory (or buffer). A terminal requests a transmission of the content from the server (content request as 1-way). In response to such request by the terminal, the server transmits the stored data to the terminal (content response as 2-way). After transmitting the data to the terminal, the server regards the data as "garbage collection (GC)" and removes the content therein.

The server examines whether or not the data was securely transmitted to the terminal. This can be done by examining ACK of a transport layer in a conventional TCP. However, such examination through ACK checks only a size of a data packet having been transmitted. The server does not know whether the data transmitted to the terminal is appropriate for device capabilities (or device environment or specifications) of the terminal.

That is, when a content is transmitted between the DCD server and the DCD terminal by using the conventional 2-way data path, even though the DCD server has successfully transmitted the content to the terminal, the DCD server could not check whether or not the content appropriate for the device capabilities or device specifications of the terminal was transmitted. For instance, if the content delivered from the DCD server has a different window size from the terminal, or if the content is coded in a different codec from the terminal, the terminal may not use (render or implement) the delivered content. In other words, the terminal cannot display the content, which is inappropriate for its device capabilities or device specifications, on a display screen. Further, in case of multimedia content, the content cannot be played.

SUMMARY OF THE INVENTION

Therefore, it is an object of the present invention to overcome a situation where a terminal receives data inappropriate for its specifications (capabilities) from a server when the data is transmitted between the server and the terminal in the conventional 2-way method.

The present invention relates to notify a server about a situation where a terminal receives data inappropriate for its specifications from a server, and to receive data appropriate for the terminal itself for use. For this, the present invention is to provide a method for transmitting a content (data) between the server and the terminal in a 3-way method, not in the conventional 2-way method.

The present invention is to provide a terminal configured to transmit a content (data) between a server and a terminal in a 3-way method.

The present invention is to provide a method for processing a content, which sends a message notifying an error that a terminal cannot execute (play) a content received from a server.

To achieve these and other advantages and in accordance with the purpose of the present invention, as embodied and broadly described herein, there is provided a method for processing a content, as a method for processing a content received from a server by a request of a terminal having a first entity (client) and a second entity (DECA; DCD Enabled Client Application), the method including: delivering, by the first entity, a content received from the server to the second entity; and when the content cannot be executed(played) by the second entity, receiving, by the first entity, a message notifying an error that the content cannot be executed from the second entity.

Preferably, the method further includes the step of receiving, by the first entity, from the second entity a status value indicating that the content cannot be executed.

Preferably, the method further includes the step of transmitting, by the first entity, to the server both the message notifying the error and the status value.

Preferably, the status value is generated by the second entity, through comparison and analysis of current device capabilities of the terminal with content-metadata extracted from the received content.

Preferably, the status value is consisted of at least one or more errored-parameters indicating attributes of the device capabilities of the terminal.

Preferably, the first entity is a device for requesting the server to deliver (send, transmit) the content, and receiving the requested content from the server.

Preferably, the second entity is a device for executing the content delivered from the first entity, extracting content-metadata from the content, comparing and analyzing the extracted content-metadata with the current device capabilities of the terminal, and checking (examining) whether or not the content can be played.

Preferably, the message notifying the error that the content cannot be executed can be a dedicated message indicating the error that the content cannot be executed or a common message including a field (or element) indicating the error that the content cannot be executed.

To achieve these and other advantages and in accordance with the purpose of the present invention, as embodied and broadly described herein, there is provided a method for transmitting a content according to one embodiment of the present invention, including:

(A) transmitting a first message requesting a first content to a server;

(B) receiving the requested first content, in response to the first message, through a second message from the server; and (C) examining whether or not the transmitted first content can be played, and transmitting a third message informing the examined result to the server.

Preferably, the step (C) is configured to analyze metadata of the first content included in the second message, and examine whether or not the first content can be played.

Preferably, the step (C) is configured, if the first content is examined to be playable, to transmit the third message to the server notifying that the first content can be played.

Preferably, the step (C) further includes, if the first content is examined not to be playable, the steps of generating a status value; and transmitting the generated status value to the server through the third message.

Preferably, the step (C) further includes the step of informing the server through the third message that the first content cannot be played.

Preferably, the method further includes the step of receiving a second content generated by the server based on the status value from the server.

Preferably, the status value includes at least one or more of a window size, a content type and a codec.

The method for transmitting a content according to the present invention, including:

analyzing and examining content-metadata to check whether or not a content transmitted from the server by request can be played;

if the content is playable based on the examination, sending a confirmation message indicating that the content is playable to the server; and if the content is not playable based on the examination, sending an error message indicating that the content is not playable to the server.

Preferably, if the content is not playable, a status value is generated and the generated status value is sent to the server.

To achieve these and other advantages and in accordance with the purpose of the present invention, as embodied and broadly described herein, there is provided a terminal, including:

a transmitter/receiver configured to transmit a content request message to a server, and to receive the content and content-metadata from the server in response to the request; and a processor configured to analyze the received content-metadata, examine whether or not the received content is playable, generate a message informing the examined result, and send the generated message to the server.

Preferably, the processor extracts information including a content type, a codec, a window size, etc. from the content-metadata, and analyzes whether or not the received DCD content is playable with device capabilities of the terminal.

Preferably, based on the analyzed result of the content-metadata, the processor is configured to generate a confirmation message and send it to the server if the content is playable, and generate an error message and send it to the server if the content is not playable.

Preferably, if the content is not playable, the processor generates a status value indicating device specifications of the terminal, and sends it to the server.

Preferably, the processor receives and processes the content generated by the server based on the status value.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 10 illustrates elements included in a ContexualInformationUpload message.

DETAILED DESCRIPTION OF THE INVENTION

Figure 1:
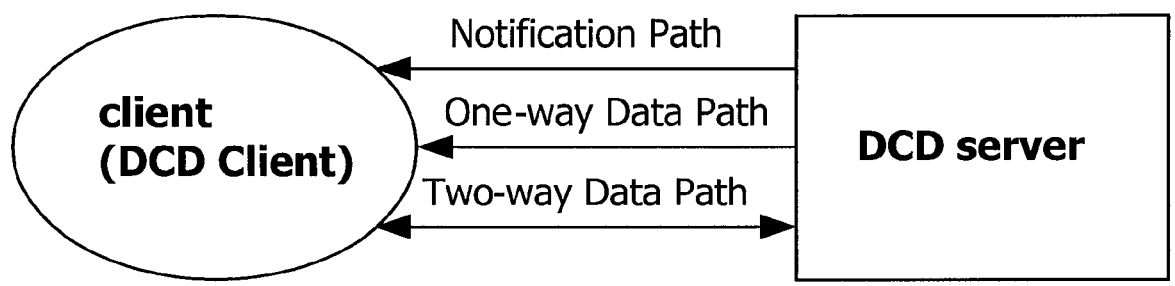
FIG. 1 is a diagram showing a logical transport path of a transport layer in a DCD.

The present invention recognizes that since a DCD content is delivered between a server and a terminal in a 2-way method in a DCD service system, when the DCD content is delivered (forwarded) to the terminal from the server, it cannot be checked whether or not the DCD content appropriate for the terminal is transmitted. Based on the recognition of the present invention, one embodiment of the present invention relates to reception of a DCD content in a 3-way method on an upper layer (i.e., an application layer), not on a lower layer (i.e., a network layer) when the DCD content is delivered between the server and the terminal in the DCD service system. By using the 3-way method between the server and the terminal, the terminal can receive the DCD content, which is appropriate for its device capabilities or device specifications (or device environment), from the server. In addition, another embodiment of the present invention relates, when a terminal cannot play a DCD content, to forward a message notifying that the content cannot be played (i.e., an error notification message) and error information named "errored-parameter" (this information is about device capabilities of the terminal, and is used to update the device capabilities of the terminal on a server side.) between devices (or entities) within the terminal and/or to the server.

According to the present invention, the terminal first requests content transmission from the server.

Second, the terminal receives a content transmitted from the server in response to the request.

Third, the terminal compares and examines its device capabilities (device specifications) to check whether or not the terminal itself can use the content, and then informs the examined result to the server. Here, the terminal opens information, so called "metadata," transmitted together with the content, and then compares the metadata with its device capabilities. Accordingly, the terminal examines whether or not the transmitted content is playable.

Fourth, if the terminal cannot play the transmitted content, the terminal sends information about terminal's device capabilities (e.g., error information or error parameter) together with a message (i.e., a notification message) notifying such to the server. Here, the error information is defined as a "status value" in below-mentioned embodiments of the present invention.

Fifth, the server updates information about the device capabilities of the terminal by using the error information when necessary, and changes a format so as to make content appropriate for the device capabilities (device specifications) of the terminal, thus to transmit to the terminal the content of the changed format.

Hereinafter, explanation of the terms used in the embodiments of the present invention will be given in detail.

Metadata is transmitted with a content. The metadata includes information about the device capabilities or specifications of the terminal (or device) which is capable of using the content. The metadata including such information may be divided into content-metadata and terminal-metadata. The terminal-metadata can be a setting value of the terminal, e.g., a codec used to code and decode a content, a window size, language, text, and the like. If the content received from the server is not identical to its setting value, the terminal cannot use the content.

Meanwhile, the metadata may be divided into a channel-metadata and a content-metadata according to its function.

The channel-metadata refers to a set of attributes regarding one or a plurality of specific DCD channels, or regarding various types of channels. Such attributes are defined to handle the DCD channel, and include delivery, storage, notification rules, and the like.

The content-metadata refers to a set of dynamic settings and rules to process a DCD content delivery. The content-metadata relates to a certain unit of a content. In addition, the content-metadata may include, for instance, rules and settings for expiry, replacement, fragmentation of the content. Such content-metadata may be included in a request message and a response message on a DCD content delivery interface. An attribute (or an element) of the content-metadata may include, for instance, Content ID (identifier of a content item), Channel ID (list of channel identifiers), MIME type (MIME type of the content item), Content length, Content name, and the like. For further explanations therefor, the document 'OMA-TS-DCD Semantics-V1' may be quoted.

The status value is a set of information about current device capabilities of the terminal, which is required to play a content received from the server. The status value is information about the device capabilities of the terminal, which is generated based on a result obtained by comparing and examining the device capabilities of the terminal with the metadata of the content.

The status value is an attribute of a parameter indicating a type of playback error when the terminal cannot play (execute) the content. Detailed characteristics of the status value will be described in the below-mentioned embodiments of the present invention.

The terminal according to the present invention is a device for commonly representing all devices, which can use a DCD content delivered from a content provider through a wired/wireless network. Accordingly, the terminal according to the present invention may include all devices, such as a mobile communication terminal having a DCD client (i.e., a software module or hardware module capable of using a DCD content), a notebook, a game player, a PDA (Personal Digital Assistant), a personal computer, electronic appliances, and the like.

Hereinafter, description will now be given in detail of the embodiments of the present invention, examples of which are illustrated in the accompanying drawings.

Figure 2:
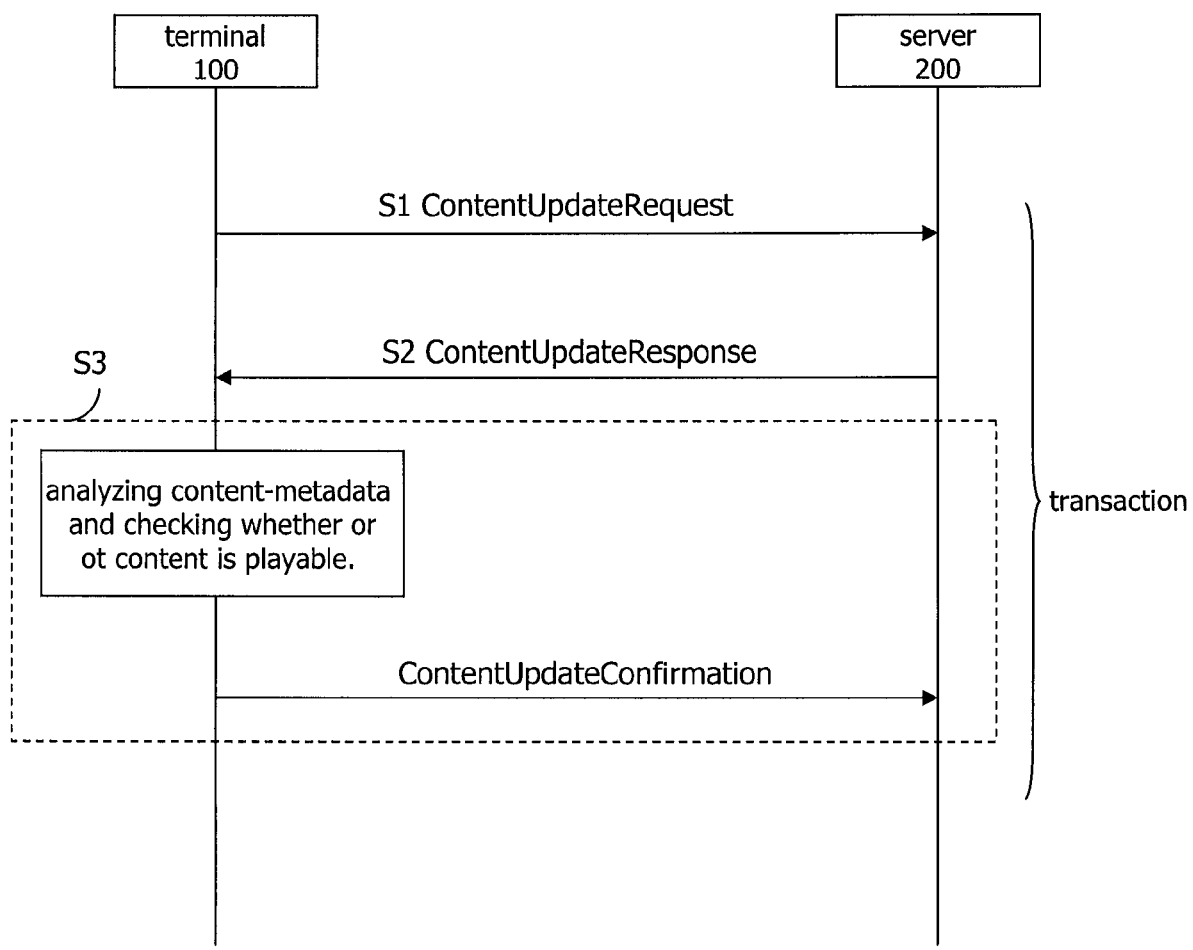
FIG. 2 is a signal flowchart showing a method for delivering a content in a 3-way method according to a first embodiment of the present invention.

FIG. 2 is a signal flowchart showing a method for delivering a content in a 3-way method according to a first embodiment of the present invention. Here, the embodiment as shown in FIG. 2 is a case where the content transmitted from the server to the terminal is playable by the terminal.

Referring to FIG. 2, a terminal 100 sends a message for requesting a DCD content (e.g., an updated content for today's headline news and weather forecasts) (a ContentUpdateRequest in FIG. 1) (S1). In response to such request, a server 200 transmits to the terminal 100 a response message including the requested content (or referred to as "content package") (a ContentUpdateResponse in FIG. 1) (S2). The response message in step S2 may include the content (i.e., the content package) or a content address (e.g., URI). Here, the content package may consist of either a content payload and content-metadata or the content address.

Meanwhile, the server 200 checks whether or not the content has been successfully transmitted to the terminal 100 using ACK of a transport layer (not shown in the drawing). Checking through ACK of the transport layer is done by comparing only a packet size of the content. The response message may include the content address (e.g., URI), instead of the content. The response message may further include information about the device capabilities for the content (i.e., content-metadata), in addition to the content itself.

The terminal 100 opens (checks or analyzes) the metadata included in the ContentUpdateResponse message, examines whether or not the received content can be played with its own device capabilities, and then sends the examined result to the server 200 (S3). These series of steps S1-S3 are considered as one transaction performed between the terminal and the server.

Hereinafter, description of step S3 will be given in detail with reference to FIG. 5.

A processor 102 of the terminal 100 retrieves (searches, reads) information about the device capabilities of the terminal (this is pre-stored in a memory provided in the terminal.), and checks whether or not the received content can be played. That is, the processor 102 of the terminal 100 opens (checks or analyzes) the content-metadata, and extracts information including a content type, a packet size, a codec, etc., as information for the received content. Then, the processor 102 of the terminal 100 compares and examines(checks) information about the terminal's device capabilities with information obtained from the metadata. According to the checked result, if the received content is determined (or checked) to be playable by the terminal 100, the terminal 100 sends a confirmation message informing a successful reception and playback of the content (i.e., ContentUpdateConfirmation in FIG. 1) to the server 200. Upon receiving the confirmation message (i.e., the ContentUpdateConfirmation message), the server 200 may know that the information about the terminal 100 stored in the server 200 (i.e., device capabilities information) and actual device capabilities of the terminal 100 are identical. Accordingly, the server 200 does not need to update information about the device capabilities of the terminal 100.

Further, the server 200 recognizes that the content has been successfully transmitted to the terminal 100, and regards the content stored in the memory (or buffer) as "garbage collection," thus to remove it from the memory (not shown in the drawing).

Figure 3:
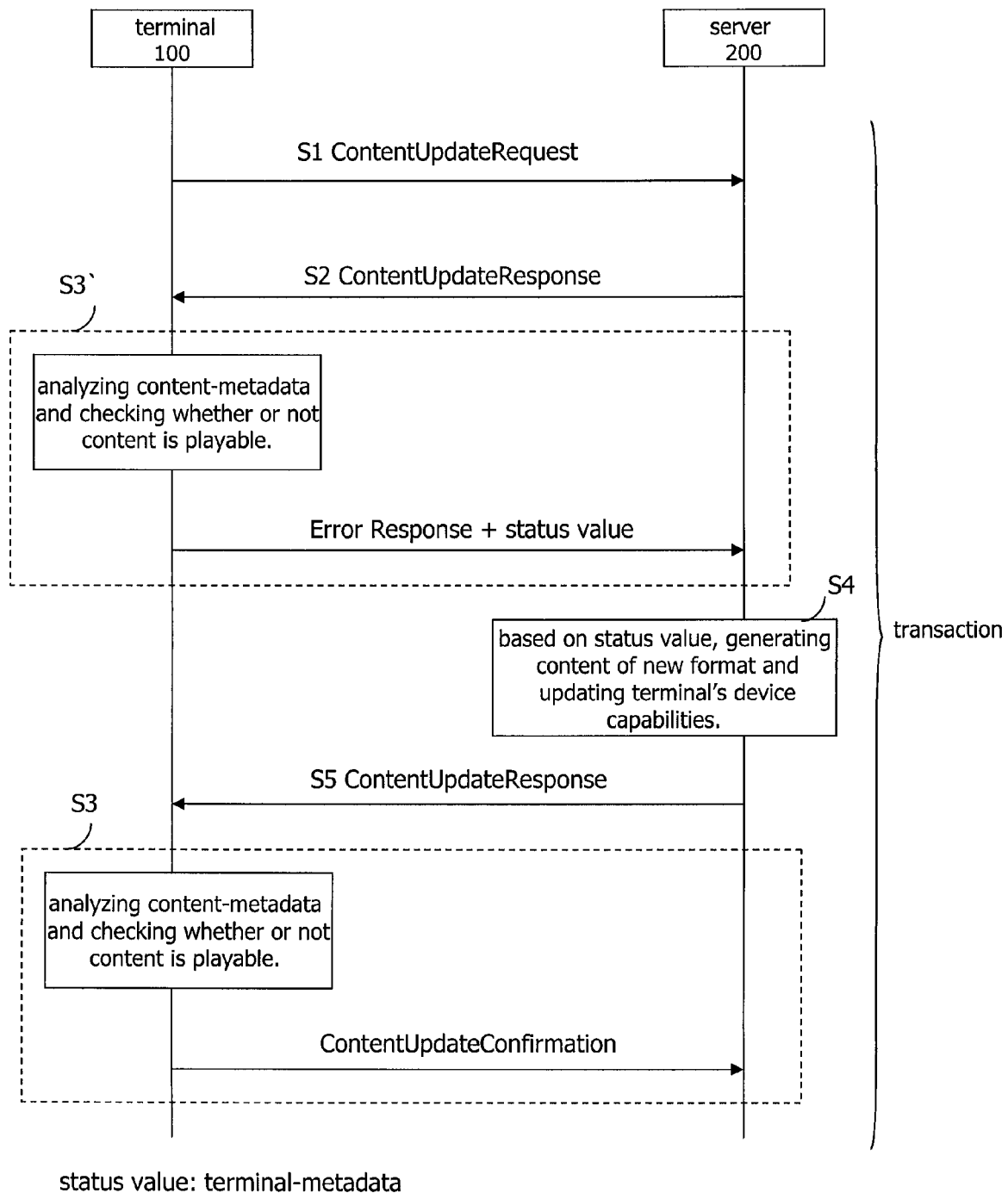
FIG. 3 is a signal flowchart showing the method for delivering a content in the 3-way method according to a second embodiment of the present invention.

FIG. 3 is a signal flowchart showing a method for delivering a content in a 3-way method according to a second embodiment of the present invention. The embodiment in FIG. 3 shows a case in which a content delivered from the server 200 to the terminal 100 cannot be played by the terminal, e.g., when a format of the content delivered to the terminal 100 cannot be played in a window size of the terminal 100, or when a codec type of the content is one which cannot be decoded by the terminal 100.

Referring to FIG. 3, steps S1-S2 in the second embodiment in FIG. 2 are the same as steps S1-S2 in FIG. 1. Therefore, following processes of step S3' in FIG. 3 will now be described in detail.

The terminal 100 opens the metadata included in the error message (Error Response), checks whether or not the received content is playable with its device capabilities, and then sends the checked result to the server 200 (S3').

Hereinafter, description of step S3' will be given in detail with reference to FIG. 5.

That is, the processor 102 of the terminal 100 retrieves information about the device capabilities of the terminal (this is pre-stored in the memory provided in the terminal.), and examines whether or not the received content is playable with the device capabilities of the terminal. The processor 102 of the terminal 100 opens (reads or checks) the content-metadata, and extracts information including the content type, the packet size, the codec, etc. as information for the received content. Here, according to the examined result, if the content is checked (determined) not to be playable due to a content format inappropriate for the window size of the terminal or mismatch of the codec, etc., the processor 102 of the terminal 100 generates a status value for the device capabilities of the terminal 100 and then sends it to the server 200. The term, "status value" indicates a set of information about the device capabilities of the terminal required to play the received content. That is, the status value may include information about a content type, a codec and a window size, etc., which the terminal 100 can process. The status value is a result obtained when the processor 102 of the terminal 100 compares the terminal's device capabilities with the metadata of the content. Such status value may be forwarded from the terminal 100 to the server 200 by being included in the error message (Error Response) or as a separate message from the error message. Also, the status value may be forwarded as a separate message from the confirmation message. The status value may include a different value from the terminal's device capabilities in information abstracted from the content-metadata as one example, or can be information having updated the terminal's device capabilities in information abstracted from the content-metadata as another example. The status value can also be referred to as "terminal-metadata" in correspondence to the content-metadata.

From the point of the terminal 100, the error message is a kind of a notification message informing the server 200 that the terminal 100 cannot play the received content. Upon receiving the error message, the server 200 analyzes the status value (i.e., terminal-metadata) included in the error message, and then newly generates a content having a format appropriate for the device capabilities of the terminal 100 (for convenience sake, a second content) from the content previously transmitted in step S2 (for convenience sake, a first content) (S4). That is, the second content newly generated by the server 200 is generated by considering the status value (i.e., terminal-metadata) so as to be playable by the terminal 100. In addition, the server 200 updates information about the device capabilities of the terminal 100 based on the status value.

The server 200 transmits the newly generated content (i.e., the second content) to the terminal 100 (S5). Operations thereafter will be performed similar to when the terminal 100 has received the playable content (step S3 in FIG. 2). Accordingly, the operations after step S5 may be quoted from the explanation for step S3 in FIG. 2. Meanwhile, the server 200 regards the previously transmitted content (the first content) as a transmission completion, thus to perform garbage collection. Also, the server 200 may perform garbage collection for the newly generated content (the second content) after receiving the confirmation message from the terminal 100.

Figure 4:
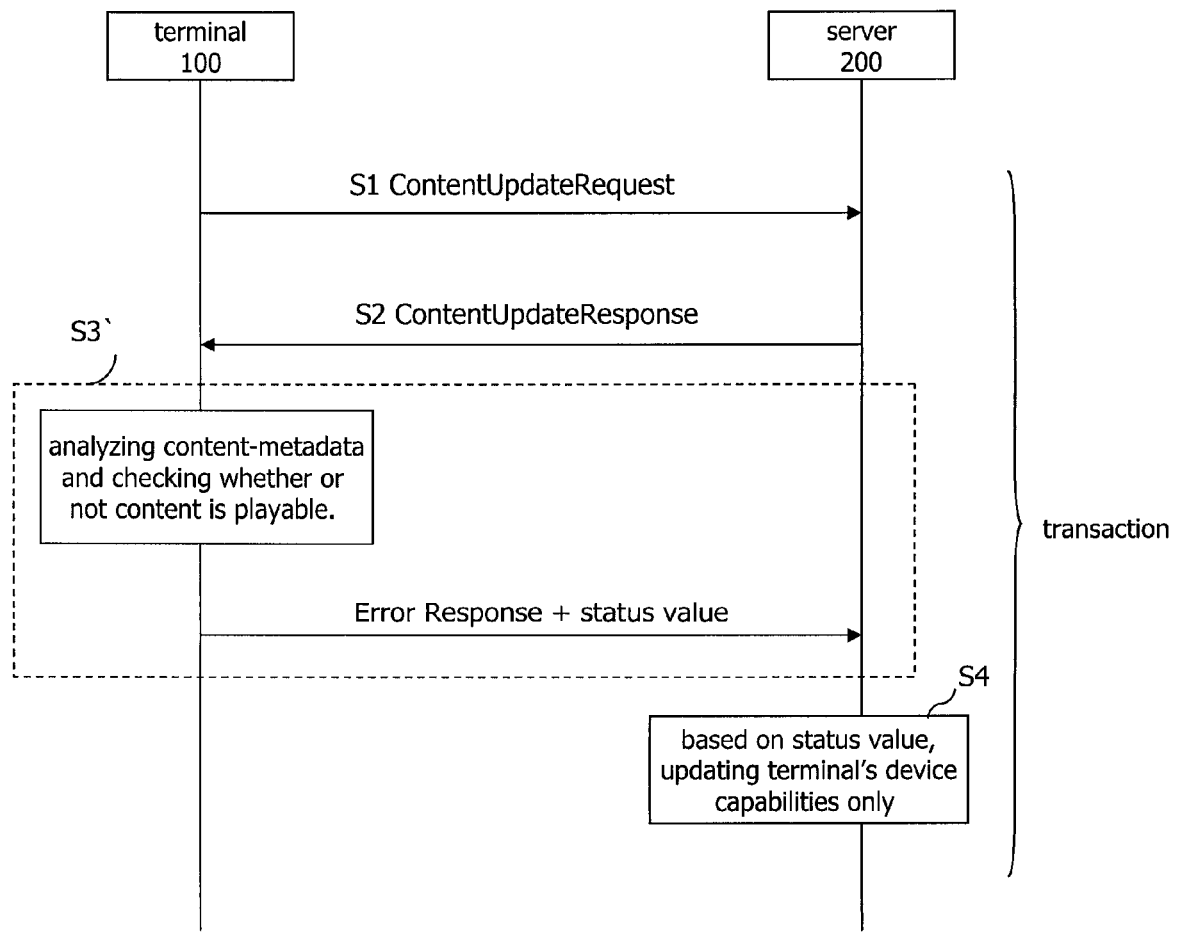
FIG. 4 is a signal flowchart showing the method for delivering a content in the 3-way method according to a third embodiment of the present invention.

FIG. 4 is a signal flowchart showing a method for delivering a content in a 3-way method according to a third embodiment of the present invention. Embodiment in FIG. 4 shows a case where a content delivered to the terminal 100 from the server 200 is not playable by the terminal, and in particular, the content becomes valid for a user of the terminal 100 only when it is transmitted in real time. As shown in the third embodiment in FIG. 4, a series of steps S1-S3' is the same as a series of steps S1-S3' in the second embodiment in FIG. 3. Hereinafter, description of differences between the second embodiment in FIG. 3 and the third embodiment in FIG. 4 will be given in detail.

For instance, in the third embodiment in FIG. 4, it is assumed that a content transmitted to the terminal 100 from the server 200 should be valid only when it is transmitted in real time, such as "stock market information." That is, the terminal user desires to use constantly changing stock market information (i.e., stock market information updated recently) in real time. If the information is delayed without being transmitted in real time, the content (the stock market information) would be a invalid and worthless data to the user. In this case, the server 200 updates only the device capabilities of the terminal (information pre-stored by the server) based on the status value transmitted from the terminal 100 in the previous step S3', and neither generates any content of a new format based on the status value nor sends it to the terminal (S4). This is because the terminal user wants the content (stock market information) being transmitted in real time, however, the newly generated content has already been delayed, thereby being treated as a useless data to the user. Further, the server 200 will regard the content transmitted in step S2 as garbage collection, thus to remove it from the memory (or buffer).

Figure 5:
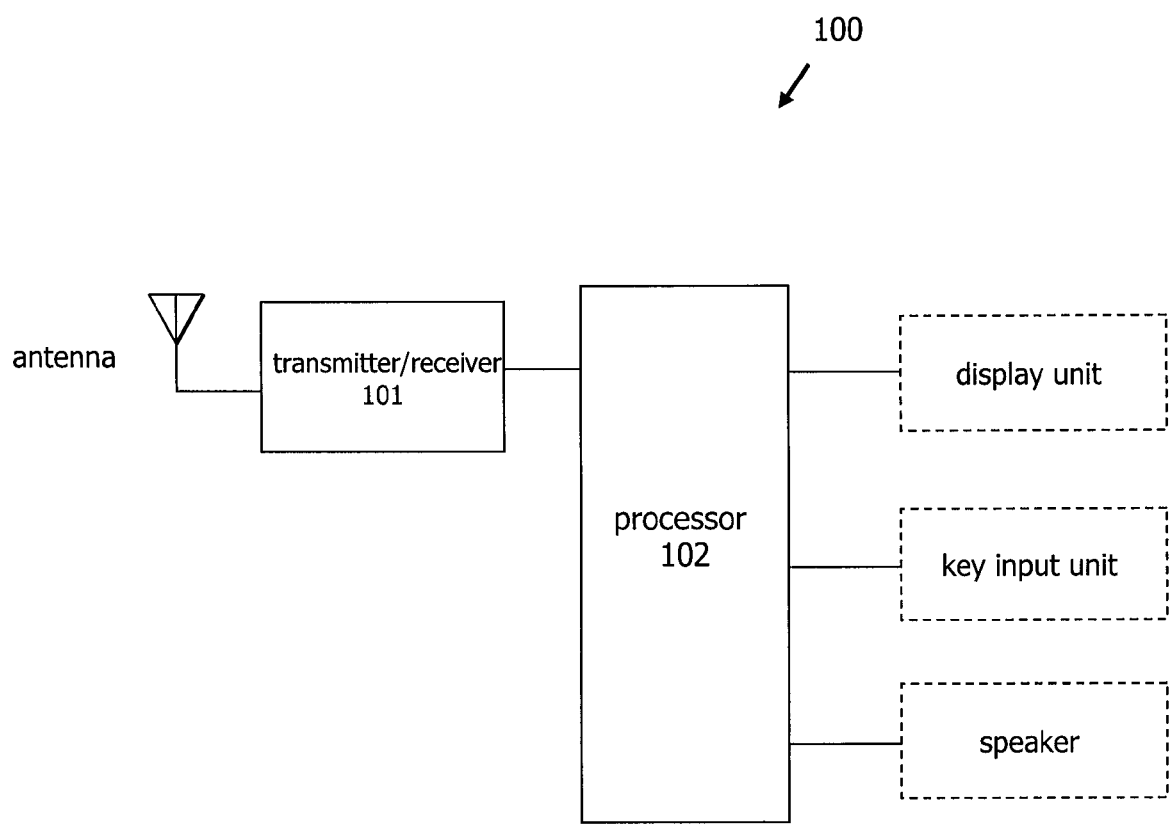
FIG. 5 is a schematic block diagram showing a terminal according to the present invention.

FIG. 5 is a schematic block diagram showing a terminal according to the present invention.

The terminal 100 according to the present invention may include a transmitter/receiver (transceiver) 101 configured to transmit a message for requesting a DCD content or a content of a similar service thereto to a server, and to receive the content and content-metadata from the server in response to the request; a processor (or controller) 102 configured to process and play the DCD content; and an output unit (e.g., a display, a speaker, etc.) configured to output the processed DCD content. In addition, the terminal according to the present invention may include a mechanical or software module (or device) so as to use the DCD content. However, detailed description thereof is understood by those skilled in the art, and explanations therefor are omitted.

The processor 102 is configured to open (read, analyze, or check) content-metadata (i.e., data having information about the terminal's device capabilities) forwarded from the server together with the DCD content, analyze the content-metadata, and check whether or not the received DCD content is playable, and then generate a message informing the checked result to the server. And, the analysis of the content-metadata can be done by comparing the content-metadata with the information about the device capabilities of the terminal 100 (firmware which is pre-stored in the terminal). That is, the processor 102 extracts information, such as the content type, the codec, the window size, etc., from the content-metadata, and then checks whether or not the received DCD content is playable with the device capabilities of the terminal. According to the analysis result of the content-metadata, if the DCD content is playable, the processor 102 plays it through the output unit (e.g., the display or the speaker). If the DCD content is not playable, the processor 102 transmits a message informing that the terminal cannot play the DCD content (so called, "error message") back to the server which transmitted the content. Here, the processor 102 generates a status value indicating information about the device capabilities (or device specifications) of the terminal, and sends it to the server. The status value is also called a "terminal-metadata." Meanwhile, if the transmitter/receiver 101 has received the content generated by the server with a new format based on the status value, the processor 102 processes the content of the new format, and then plays it through the output unit.

Hereinafter, description of a fourth embodiment in FIG. 6 through a sixth embodiment in FIG. 8 will be given in detail. Embodiments in FIGS. 6 through 8 describe elements of the terminal according to functions performed by the terminal. That is, the terminal 100 includes the transmitter/receiver 101 for sending/receiving a message, and an application (DECA; DCD Enabled Client Application) for opening (read or check) the content delivered from the server 200 and checking whether or not it is playable. The DECA 120 may be an element included in the processor 102 in FIG. 5 or may be an independent entity of the terminal.

The transmitter/receiver 101 is an entity (a device or a client) configured to send/receive messages between the servers, and to receive a content from the server 200. Here, the message sending/receiving with the server is the same as described in the embodiments in FIGS. 2 through 4. Since the transmitter/receiver 101 cannot open the content received from the server, the transmitter/receiver 101 transmits the content to the DECA 120.

The DECA 120 checks whether or not the content forwarded from the transmitter/receiver 101 (i.e., the content transmitted from the server) can be played or displayed, and then sends the checked result back to the transmitter/receiver 101. The DECA 120 is divided into an active status and an inactive status. The active status of the DECA 120 refers to a state when the DECA 120 normally operates. In other words, the active status refers to the status capable of checking whether or not the content is playable with the device capabilities of the terminal 100 by examining metadata included in the content after the DECA 120 opens the content. Meanwhile, the inactive status refers to a status when the DECA 120 abnormally operates. That is, the inactive status of the DECA 120 refers to a status capable of not checking whether or not the content is playable due to a certain problem or condition (e.g., technical problem, or unintended or intended situation of a terminal user).

Figure 6:
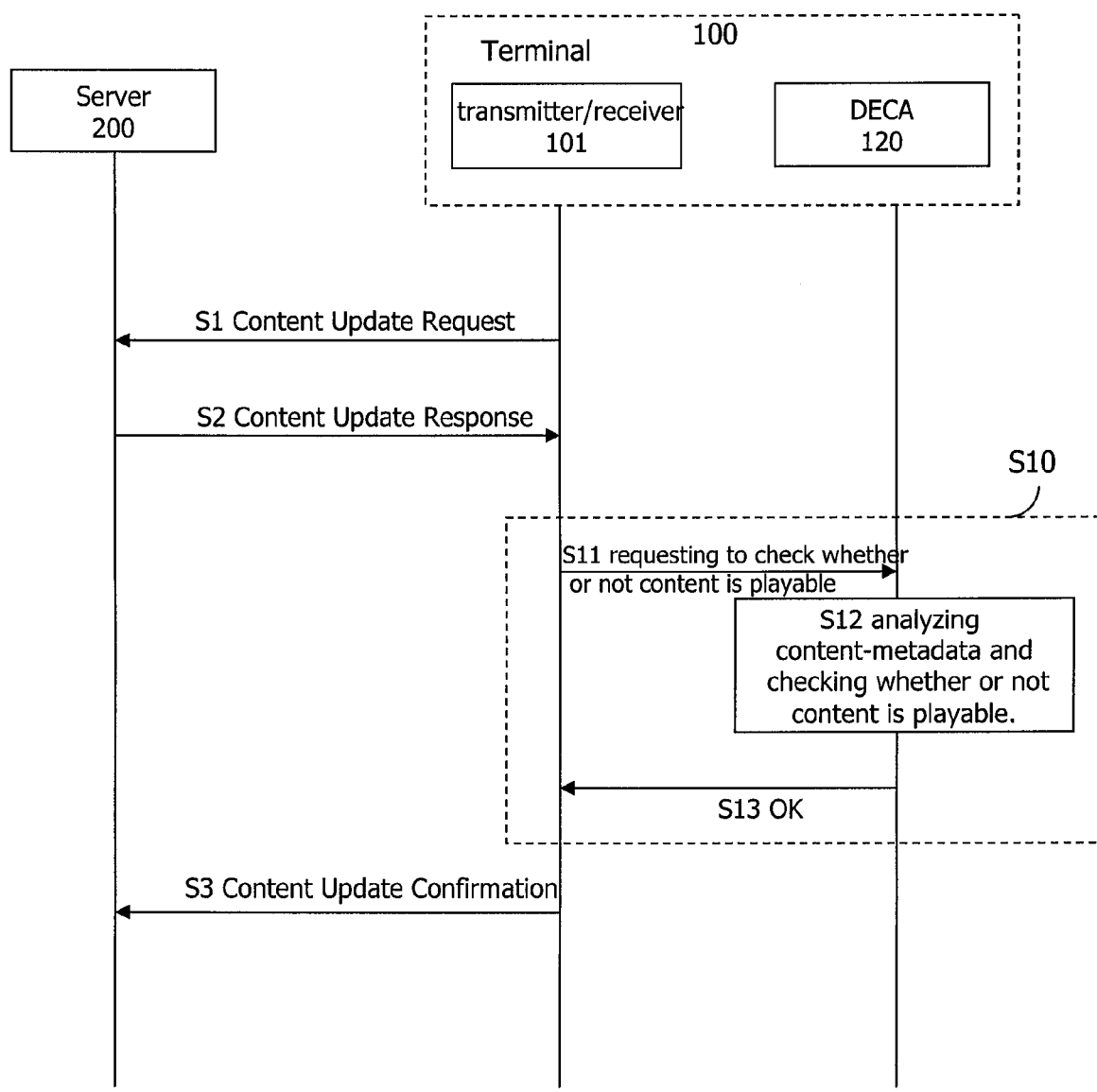
FIG. 6 is a signal flowchart showing a method for delivering a content in a 3-way method of the present invention when a DECA is activated according to a fourth embodiment of the present invention.

FIG. 6, as a fourth embodiment of the present invention, describes a case in which the DECA 120 is in the active status, and a content is playable with the device capabilities of the terminal. Operations of steps S1-S3 in FIG. 6 are the same as those of steps S1-S3 in FIG. 1. The subject for sending/receiving the message indicating steps S1-S3 in FIG. 6 is the transmitter/receiver 101 of the terminal 100. Accordingly, reference numerals in FIG. 1 are the same as those in FIG. 6, and explanations therefor are quoted with the corresponding explanations in FIG. 1.

Referring to FIG. 6, the transmitter/receiver 101 of the terminal 100 receives a response message (ContentUpdateResponse in FIG. 1) including the requested content from the server 200 by the request made in step S1 (S2). Here, the response message may include a content address (e.g., URI), instead of the content. In addition, the response message may include information about the device capabilities (device specifications) for the content (i.e., the information refers to content-metadata) as well as the content.

A procedure is performed to check whether or not the content forwarded from the server 200 through step S2 is playable (S10). That is, the transmitter/receiver 101 sends the response message to the DECA 120, and requests to check whether or not the content is playable (S11). The DECA 120 of the terminal 100 is currently in the active status. Therefore, the DECA 120 opens (read or check) the metadata included in the response message (ContentUpdateResponse), and checks whether or not the received content is playable with its device capabilities (S12). If the content is checked to be playable in step S12, the DECA 120 sends a message informing that it is playable (OK in FIG. 6) to the transmitter/receiver 101 (S13).

Then, the transmitter/receiver 101 sends a confirmation message (ContentUpdateConfirmation in FIG. 6) to the server 200, informing about successful reception and playback of the content (S3). Here, having received the confirmation message (i.e., ContentUpdateConfirmation message), the server 200 may know that information about the terminal 100 stored in the server 200 (information about the device capabilities or device specifications) and actual device capabilities of the terminal 100 are identical. Accordingly, the server 200 does not need to update information about the device capabilities of the terminal 100. Further, the server 200 recognizes that the content has been successfully transmitted to the terminal 100, and regards the content stored in the memory (or the buffer) as garbage collection, thus to remove it from the memory (not shown).

Figure 7:
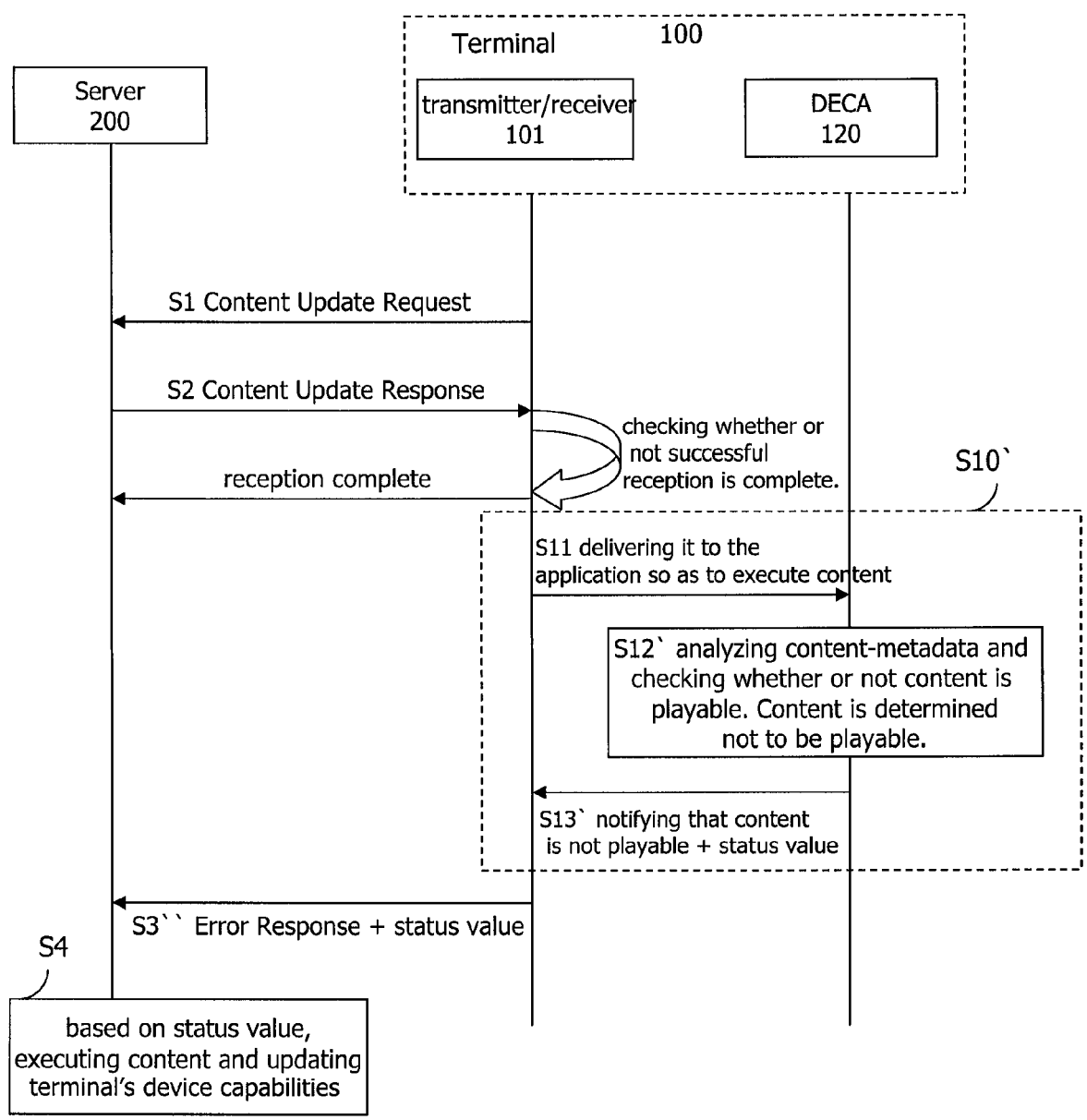
FIG. 7 is a signal flowchart showing the method for delivering a content in the 3-way method of the present invention when the DECA is not activated according to a fifth embodiment of the present invention.

FIG. 7, as a fifth embodiment of the present invention, describes a case in which the DECA 120 is in the inactive status, and a content is not playable with the device capabilities of the terminal.

Referring to FIG. 7, operations of steps S1-S2 in a seventh embodiment in FIG. 7 are the same as those of steps S1-S2 in FIG. 6. Accordingly, description of the operations after step S2 in FIG. 7 will be given in detail.

After the message in step S2 is transmitted to the transmitter/receiver 101 of the terminal 100, the server 200 waits for either a confirmation message or error message thereof. However, the DECA 120 is currently in the inactive status. Accordingly, the terminal 100 informs that the message in step S2 has been successfully received, and that it cannot check whether or not the content is playable since the DECA 120 is inactivated ("reception complete" in FIG. 7). This is to prevent the server 200 from infinitely waiting for the confirmation message (S3) or the error message (S3") for the message in step S2.

Thereafter, when the DECA 120 is changed into the active status from the inactive status, it is checked whether or not the content forwarded from the server 200 through the step S2 is playable (S10'). That is, the transmitter/receiver 101 forwards the received content to the DECA 120 (S11).

The DECA 120 opens (reads, analyzes or checks) the metadata included in the response message, and checks whether or not the received content is playable with its device capabilities (S12').

Hereinafter, description of the previous step S12' will be given in detail.

The DECA 120 of the terminal 100 retrieves (searches, reads) information about the terminal's device capabilities (pre-stored in the memory provided in the terminal), and then checks whether or not the received content is playable with the device capabilities of the terminal. That is, the DECA 120 opens the content-metadata, and extracts information including the content type, the packet size, the codec, etc., as information about the received content. Here, as a result of checking the content-metadata, if the received content is checked (determined) not to be playable due to a content format inappropriate for the window size of the terminal or mismatch of the codec, etc., the DECA 120 generates a status value for current device capabilities of the terminal 100, and then forwards it to the transmitter/receiver 101. Then, the transmitter/receiver 101 sends it to the server 200.

The term, "status value" indicates a set of information about current device capabilities of the terminal 100 required to play the received content. That is, the status value may include information about the content type, the codec, the window size, etc., which the terminal 100 can process. The status value is a result obtained when the DECA 120 compares and examines the device capabilities of the terminal with the metadata of the content.

The DECA 120 sends a notification message to the transmitter/receiver 101, notifying that the content is not playable (S13'). Here, the notification message may include the status value. The status value may also be transmitted as a separate message from the notification message.

Meanwhile, description of another embodiment of the notification message in step S13' will be given in detail.

If the DECA 120 cannot play (execute) the received content-metadata, if the received content is determined to be inexecutable according to examination (analysis) result of the content-metadata, or if the received content is not suitable for being executed, the DECA 120 transmits to the transmitter/receiver 101 a failure response message (i.e., notifying that the content is not playable) in response to step S11. Here, the DECA 120 transmits the failure response message to the transmitter/receiver 101 with an error code (i.e., a code indicating an error type that the content is not playable) and an errored-parameter (e.g., parameter including a content type indicating the content cannot be executed by the DECA and capability-related information).

The transmitter/receiver 101 sends to the server 200 a ContexualInformationUpload message including a so-called "unsupported content-metadata" in order to inform to the server 200 that the received content-metadata (or the received content) cannot be supported by the transmitter/receiver 101. Here, the unsupported content-metadata refers to a set of information indicating that the content meta-data (or the content) cannot be executed (e.g., information about capabilities and specifications) i.e., information regarding capability informing that the content-metadata (or the received content) cannot be supported. Also, the unsupported content-metadata is forwarded in the form of a list of stings in order for the transmitter/receiver 101 to inform that the received content meta-data (or content) cannot be supported by the terminal 100, for instance, if the DCD client is upgraded or changed its capabilities, or if previously supported metadata (or content) is now changed into one that cannot be supported. FIG. 10 is a diagram showing ContexualInformationUpload messages, including an unsupported content-metadata (as one element included in the ContexualInformationUpload message) and other elements. In addition, the content of the detailed object/construction of the ContexualInformationUpload message would be the same as that of the ContexualInformationUpload message described in OMA-TS-DCD_Semantics_V1_0-20080331-D. The detail description of the ContexualInformationUpload message, therefore, would be referred from OMA-TS-DCD_Semantics_V1_0-20080331-D. unsupported-content-metadata (as one element included in the ContexualInformationUpload message) is, however, defined in the present invention.

From the point of the terminal 100, the error message and the ContexualInformationUpload message are a kind of a notification message informing the server 200 that the terminal 100 cannot play the received content. The status value may include only a different value from the terminal's device capabilities in information extracted from the content-metadata as one example, or can be information having updated the terminal's device capabilities in information extracted from the content-metadata as another example. The status value can be referred to as the "terminal-metadata" in correspondence to the content-metadata, and also be the same as the unsupported content-metadata. Meanwhile, the status value may be transmitted as a separate message from the error message. The status value (i.e., terminal-metadata) may be expressed as one or more parameters (errored-parameter) indicating an error type (attribute). That is, each parameter may be information indicating different attributes of the device capabilities of the terminal 100 (e.g., a codec, a window size, a content type, etc. of the terminal) as a result of comparing and analyzing, by the DECA 120, the device capabilities of the terminal with the content-metadata (i.e., information transmitted with the content from the server, e.g., a content type, a window size, etc.). Further, the status value may include a code indicating an error type (error code). Such error type is consisted of integers, and each integer (i.e., error code) may be configured to indicate a pre-designated error type.

Upon receiving the error message, the server 200 analyzes the status value (terminal-metadata) included in the error message, and then newly generates a content of a format appropriate for device capabilities of the terminal 100 (for convenience sake, a second content) from the content transmitted in step S2 (for convenience sake, a first content) (S4). That is, the second content newly generated by the server 200 is generated by considering the status value (terminal-metadata) so as to be playable by the terminal 100. Further, the server 200 updates information about the device capabilities of the terminal 100 based on the status value. Thereafter, the newly generated content (the second content) is forwarded to the transmitter/receiver 101 of the terminal 100 from the server 200. Then, the content may be executed by the DECA 120.

Figure 8:
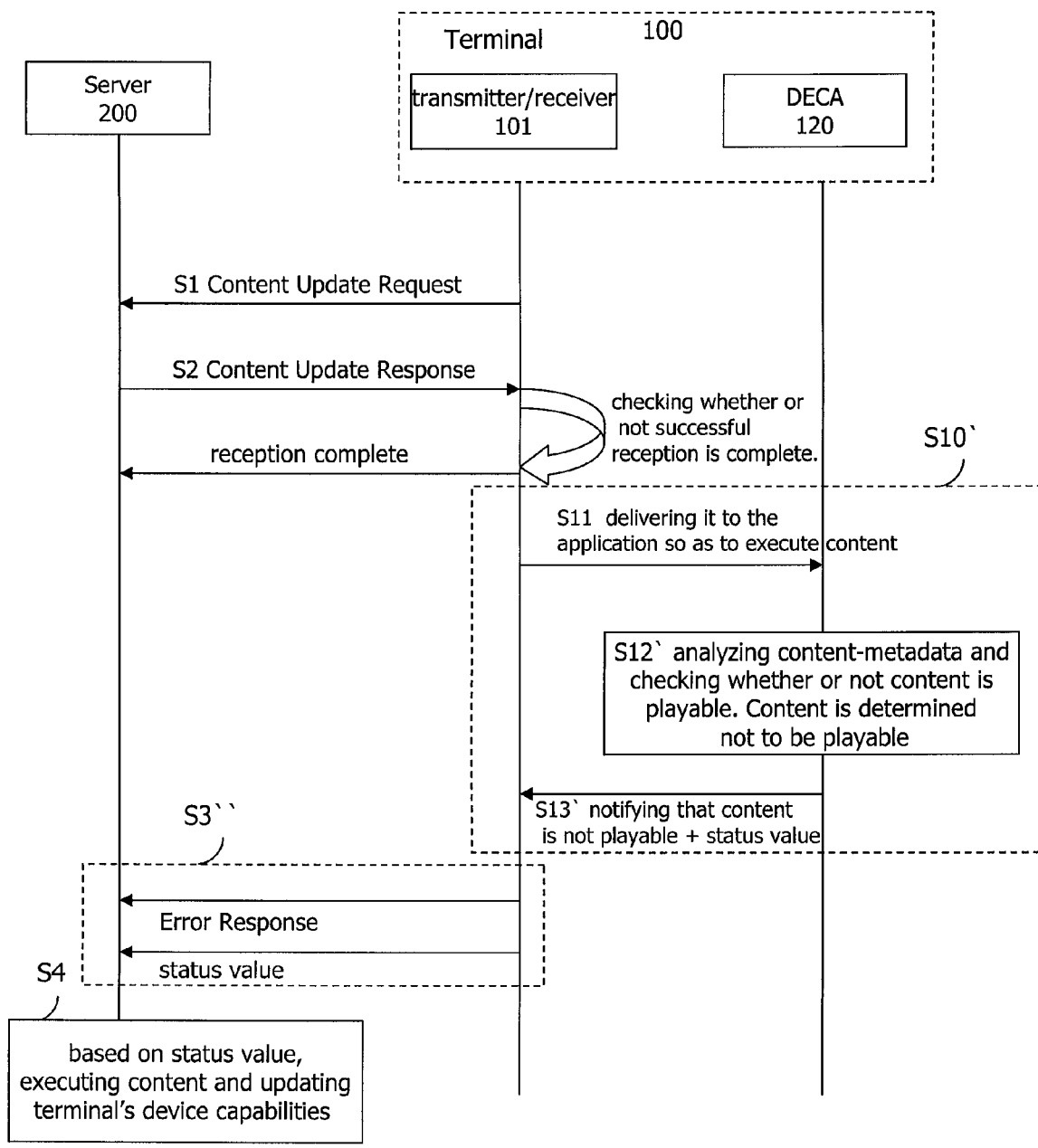
FIG. 8 is a signal flowchart showing the method for delivering a content in the 3-way method of the present invention when the DECA is not activated according to a sixth embodiment of the present invention.

FIG. 8 is a sixth embodiment of the present invention, which is similar to the fifth embodiment in FIG. 7. Here, there is a difference in that the status value is delivered from the terminal 100 to the server 200 as a separate message from the error message in the embodiment in FIG. 8 (step S3" in FIG. 8). As another embodiment, the transmitter/receiver 101 in step S3" may independently (separately) transmit to the server 200 the ContexualInformationUpload message and the unsupported content-metadata.

Figure 9:
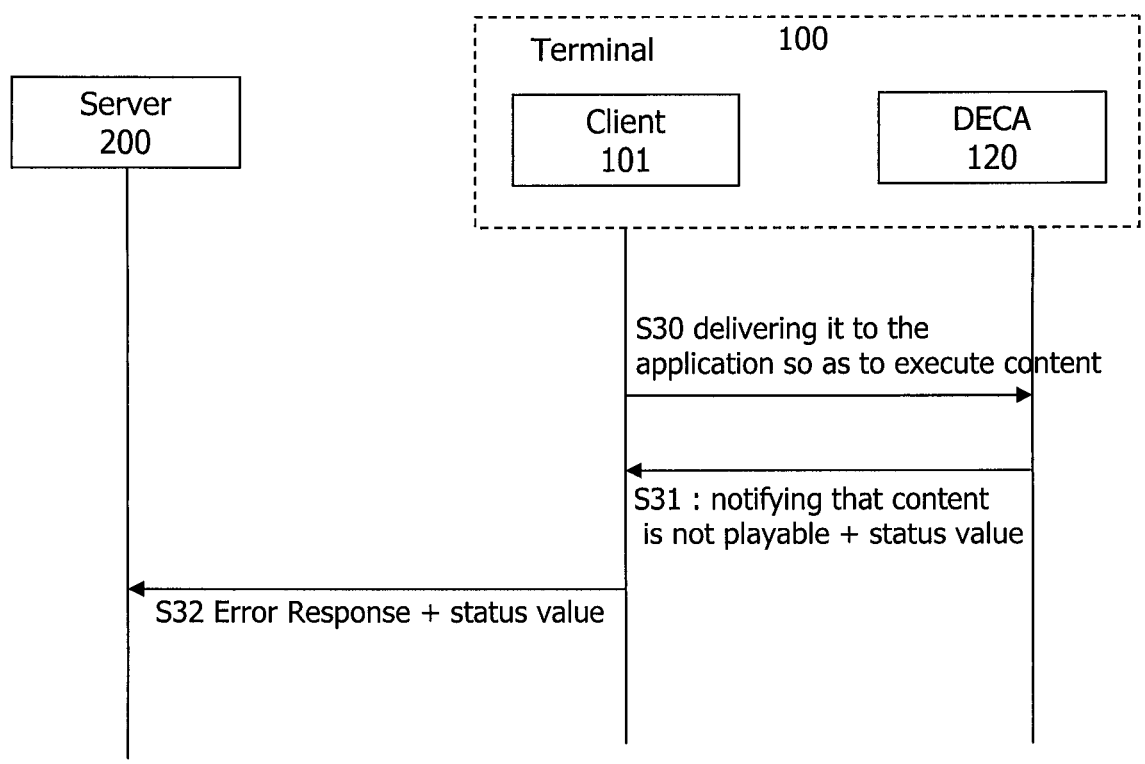
FIG. 9 is a signal flowchart reconstructing only a part notifying an error when the content is not playable in embodiments of FIGS. 4, 7 and 8 according to one embodiment of the present invention.

FIG. 9 is a signal flowchart abstracting (selecting) only a part notifying an error when the content is not playable in the embodiments of FIGS. 4, 7 and 8 according to one embodiment of the present invention. In particular, FIG. 9 shows signaling of the messages in FIG. 7. Accordingly, in the embodiment in FIG. 9, step S30 in FIG. 9 corresponds to step S11 in FIG. 7, step S31 in FIG. 9 to step S13' in FIG. 7, and step S32 in FIG. 9 to step S3" in FIG. 7, respectively. Features of each signaling (steps S30-S32) in FIG. 9 are the same as the respective signaling (steps S11, S13', and S3") in FIG. 7. And, the client as an element of the terminal in FIG. 9 corresponds to the transmitter/receiver in FIG. 7. Thus, only the name is changed, but its function and operation are the same as those of the transmitter/receiver.

When the content requested by the terminal is received from the server, the client 101 sends the received content to the DECA 120 (S30). DECA 120 analyzes (checks) content-metadata, and determines whether or not the content can be executed (played). If the DECA 120 cannot execute (play) the content with its capabilities, the DECA 120 sends to the transmitter/receiver 101 a notification message (or a signal) informing an error that the content is not executable (playable) (S31). Here, the notification message is a dedicated message for notifying an error (i.e., an error notification message) or a common message. If the common message is used to notify the error, the common message may include a field or parameter (element) dedicated for indicating the error.

Meanwhile, a status value (or error code and/or error parameter) may be delivered to the client 101 from the DECA 120 together with the error notification message in step S31. As described above, the status value may be one or more parameters (i.e., errored-parameter) indicating an error type (or attribute), and include an error code.

The DECA 120 sends to the server the error notification message forwarded from the client 101 (the dedicated error notification message or the common message having the field notifying the error) and the status value (S32).

Meanwhile, description of another embodiment of the notification message in step S32 will be given in detail.

If the DECA 120 cannot play (execute) the received content-metadata, if the received content is determined to be inexecutable according to examination (analysis) result of the content-metadata, or if the received content is not suitable for being executed, the DECA 120 transmits to the client 101 a failure response message in response to step S30. Here, the DECA 120 transmits the failure response message to the client 101 with an error code (i.e., a code indicating an error type that the content is not playable) and an errored-parameter (e.g., parameter including a content type indicating the content cannot be executed by the DECA and capability-related information). The client 101 sends to the server 200 a ContexualInformationUpload message including a so-called "unsupported content-metadata" in order to inform to the server 200 that the received content-metadata (or the received content) cannot be supported by the client 101. Here, the unsupported content-metadata is the same as that described in the embodiments in FIG. 7. The foregoing embodiments and advantages are merely exemplary and are not to be construed as limiting the present invention. This description is intended to be illustrative, and not to limit the scope of the claims. Many alternatives, modifications, and variations will be apparent to those skilled in the art. Functions and operations of the components in the present invention are not limited to their names. For instance, the DECA 120 of the terminal 100 according to the present invention performs a part of functions of the controller 102. Thus, the DECA 120 may be configured as a sub-element of the controller 102 or to perform a corresponding function in replacement of the controller 102. The DECA 120 may also be configured in the terminal 100 as a separate element from the controller 102. In addition, the status value and the unsupported content-metadata have different names, but their functions and operations may be the same. For instance, the unsupported content-metadata can be implemented such that it may signify the status value itself or it may have the same information as the status value. Therefore, all changes and modifications that fall within the metes and bounds of the claims, or equivalents of such metes and bounds are therefore intended to be embraced by the appended claims.

Effect of the Invention

In the present invention, the terminal receives a DCD data (content) from the server by using the 3-way method between the server and the terminal.

The terminal according to the present invention uses metadata transmitted with the content from the server. The terminal according to the present invention uses the metadata to compare it with its device capabilities (device specifications) and to check whether or not the terminal can play the content.

The terminal according to the present invention transmits the checked result to the server such that the server may change a format so as to make the content appropriate for being played by the terminal.

The terminal according to the present invention may receive and play the content of the new format transmitted from the server.

According to the present invention, in a communication method between the server and the terminal, the terminal sends a checked result of whether or not the content transmitted from the server is playable, thus to receive a content of an appropriate format which the terminal itself can play from the server.

What is claimed is:

1. A method for receiving a content from a server, the method performed by a terminal, the terminal including a Dynamic Content Delivery (DCD) Enabled Client Application (DECA) for using the content and a DCD client for interacting with the DECA, the method comprising:

receiving, by the DCD client, the content from the server;

determining, by the DCD client, whether to transmit a confirmation message to the server;

transmitting, by the DCD client, the confirmation message if the receiving of the content is successful and the DECA is in an inactive status;

delivering, by the DCD client, the received content to the DECA; and transmitting, by the DCD client, an error message notifying that the content is unusable to be rendered due to an error caused by one of a content provider, the server, the DCD client, and the DECA, wherein the error message comprises error level information indicating one of failure or warning, an error code of an integer indicating that the content is unusable content, and an errored-parameter indicating an attribute found to be in error of current device capabilities of the terminal.

2. The method of claim 1, wherein the error message further comprises a status value indicating the current device capabilities of the terminal.

3. The method of claim 1, wherein the attribute found to be in error is generated by the DCD, client through comparison of the current device capabilities of the terminal with content-metadata extracted from the received content.

4. The method of claim 1, further comprising:
transmitting, by the DCD client, to the server a ContexualInformationUpload message notifying that the content received from the server cannot be executed.

5. The method of claim 4, wherein the ContexualInformationUpload message comprises an unsupported content-metadata.

6. A terminal, comprising:
a Dynamic Content Delivery (DCD) Enabled Client Application (DECA) for using a content; and
a DCD client adapted to receive the content from a server, determine whether to transmit a confirmation message to the server, transmit the confirmation message if the receiving of the content is successful and the DECA is in an inactive status, deliver the received content to the DECA, and transmit an error message notifying that the content is unusable to be rendered due to an error caused by one of a content provider, the server, the DCD client, and the DECA,
wherein the error message comprises error level information indicating one of failure or warning, an error code of an integer indicating that the content is unusable content, and an errored-parameter indicating an attribute found to be in error of current device capabilities of the terminal.

7. The terminal of claim 6, wherein the DCD client extracts at least one of a content type, a codec, and a window size from content-metadata, and analyzes whether or not the content is playable with the current device capabilities of the terminal.

8. The method of claim 2, further comprising:
receiving, by the DCD client, an updated content from the server; and
delivering, by the DCD client, the updated content to the DECA,
wherein the current device capabilities of the terminal are stored to the server, and the updated content is newly generated by the server based on the current device capabilities of the terminal so as to make the updated content appropriate for the current device capabilities of the terminal.

9. The terminal of claim 6, wherein the error message further comprises a status value indicating the current device capabilities of the terminal, and the attribute found to be in error is generated by the DCD client through comparison of the current device capabilities of the terminal with content-metadata extracted from the received content.

10. The terminal of claim 9, wherein the DCD client is further adapted to receive an updated content from the server, and deliver the updated content to the DECA, and
wherein the current device capabilities of the terminal are stored to the server, and the updated content is newly generated by the server based on the current device capabilities of the terminal so as to make the updated content appropriate for the current device capabilities of the terminal.

11. A method for receiving a content from a server, the method performed by a terminal, the terminal including an application for using the content and a client for interacting with the application, the method comprising:
receiving, by the client, the content from the server;
determining, by the client, whether to transmit a confirmation message to the server;
transmitting, by the client, the confirmation message if the receiving of the content is successful and the application is in an inactive status;
delivering, by the client, the received content to the application; and
transmitting, by the client, an error message notifying that the content is unusable to be rendered due to an error caused by one of a content provider, the server, the client, and the application,
wherein the error message comprises error level information indicating one of failure or warning, an error code of an integer indicating that the content is unusable content, and an errored-parameter indicating an attribute found to be in error of current device capabilities of the terminal.

12. The method of claim 11, wherein the error message further comprises a status value indicating the current device capabilities of the terminal, and the attribute found to be in error is generated by the client through comparison of the current device capabilities of the terminal with content-metadata extracted from the received content.

13. The method of claim 12, further comprising:
receiving, by the client, an updated content from the server; and
delivering, by the client, the updated content to the application,
wherein the current device capabilities of the terminal are stored to the server, and the updated content is newly generated by the server based on the current device capabilities of the terminal so as to make the updated content appropriate for the current device capabilities of the terminal.

14. A terminal, comprising:
an application for using a content; and
a client adapted to receive the content from a server, determine whether to transmit a confirmation message to the server, transmit the confirmation message if the receiving of the content is successful and the application is in an inactive status, deliver the received content to the application and transmit an error message notifying that the content is unusable to be rendered due to an error caused by one of a content provider, the server, the client, and the application,
wherein the error message comprises error level information indicating one of failure or warning, an error code of an integer indicating that the content is unusable content, and an errored-parameter indicating an attribute found to be in error of current device capabilities of the terminal.

15. The terminal of claim 14, wherein the error message further comprises a status value indicating the current device capabilities of the terminal, and the attribute found to be in error is generated by the client through comparison of the current device capabilities of the terminal with content-metadata extracted from the received content.

16. The terminal of claim 15, wherein the client is further adapted to receive a updated content from the server, and deliver the updated content to the application, and
wherein the current device capabilities of the terminal are stored to the server, and the updated content is newly generated by the server based on the current device capabilities of the terminal so as to make the updated content appropriate for the current device capabilities of the terminal.

* * * * *